(12) United States Patent
Hough et al.

(10) Patent No.: US 7,353,247 B2
(45) Date of Patent: Apr. 1, 2008

(54) QUERYING APPLICATIONS USING ONLINE MESSENGER SERVICE

(75) Inventors: Paul James Hough, Dublin (IE);
Ulrich Homann, Kirkland, WA (US);
Jason P. Allen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 977 days.

(21) Appl. No.: 10/016,790

(22) Filed: Oct. 19, 2001

(65) Prior Publication Data

US 2003/0079024 A1    Apr. 24, 2003

(51) Int. Cl.
*G06F 15/17* (2006.01)

(52) U.S. Cl. ............ 709/202; 709/207; 709/217; 709/219; 709/223

(58) Field of Classification Search ........ 709/206–207, 709/203, 202, 246
See application file for complete search history.

(56) References Cited

U.S. PATENT DOCUMENTS

| | | | | |
|---|---|---|---|---|
| 4,849,898 | A * | 7/1989 | Adi ......................... | 707/5 |
| 5,692,107 | A * | 11/1997 | Simoudis et al. ............ | 706/12 |
| 6,346,952 | B1 * | 2/2002 | Shtivelman ................ | 715/758 |
| 6,373,853 | B1 * | 4/2002 | Yoshida ...................... | 370/465 |
| 6,430,602 | B1 * | 8/2002 | Kay et al. ................... | 709/202 |
| 6,564,261 | B1 * | 5/2003 | Gudjonsson et al. ....... | 709/227 |
| 6,993,555 | B2 * | 1/2006 | Kay et al. ................... | 709/202 |
| 7,013,300 | B1 * | 3/2006 | Taylor ........................ | 707/4 |
| 7,146,404 | B2 * | 12/2006 | Kay et al. ................... | 709/202 |
| 2001/0014852 | A1 * | 8/2001 | Tsourikov et al. ......... | 704/9 |

OTHER PUBLICATIONS

"Slennox's Eggdrop Page"; Jan. 19, 2001; http://web.archive.org/web/20010119001000/http://www.egghelp.org/.*
Slennox's Eggdrop Page: what is; Feb. 17, 2001; http://web.archive.org/web/20010217102309/www.egghelp.org/whatis.shtml.*
Slennox's Eggdrop Page: commands index; Feb. 17, 2001; http://web.archive.org/web/20010204235500/www.egghelp.org/commands/index.shtml.*
Slennox's Eggdrop Page: frequently asked questions; Feb. 5, 2001; http://web.archive.org/web/20010205044900/www.egghelp.org/faq.shtml.*
Slennox' Eggdrop page: using; Feb. 17, 2001; http://web.archive.org/web/20010217102334/www.egghelp.org/using.shtml.*
Slennox's Eggdrop page; setup; Feb. 16, 2001; http://web.archive.org/web/20010216175205/www.egghelp.org/setup.shtml.*

(Continued)

*Primary Examiner*—Saleh Najjar
*Assistant Examiner*—Benjamin R Bruckart
(74) *Attorney, Agent, or Firm*—Workman Nydegger (57) ABSTRACT

A software application or resource is enabled to participate in a messaging service session conducted over a network and to respond to plain language queries much like a live participant. The software resource registers with a messaging service server when the software resource is initially executed, making it available if included in a user's list of contacts, to be added as a participant. During a messaging service session, a user can direct a message or query to the software resource that is participating. The software resource parses the query, and if the query is understood and data are available, transmits a response that appears within the instant message dialogue window of the users participating in the messaging service session.

27 Claims, 4 Drawing Sheets

OTHER PUBLICATIONS

Slennox's Eggdrop page; setup; Nov. 4, 1999; http://web.archive.org/web/20010216175205/www.egghelp.org/setup.shtml.*

Free Online Dictionary of Computing; Aug. 22, 2001; http://web.archive.org/web/20010622192251/http://foldoc.doc.ic.ac.uk/foldoc/foldoc.cgi?bot.*

"The Internet Archive" Sep. 2001, www.rupbot.com all links incorporated by reference.*

"The Internet Archive" Aug. 2001, www.newjersey.f2s.com/nodbot all links incorporated by reference.*

* cited by examiner

QUERYING APPLICATIONS USING ONLINE MESSENGER SERVICE

FIELD OF THE INVENTION

The present invention generally relates to the use of a plain language query to obtain data from a software application, and more specifically, to the interaction between an online messaging service and a software application, to obtain a response from the software application to a plain language query entered by a user through the online messaging service.

BACKGROUND OF THE INVENTION

Online instant messaging services, such as Microsoft Corporation's MSN MESSENGER SERVICE™, provide a very convenient way for people to communicate or chat with others who are connected to a network. A user can designate specific individuals who also share a connection to the instant messaging service as contacts. The status of those designated contacts is then graphically indicated to the user when the messaging window is opened, so that the user can determine if a contact is available to engage in a chat session, is away (or the individual's computer is not energized or not connected to the network), or is otherwise engaged. A user can selectively change the status assigned to the icon representing that user, which appears in the messaging window of all others users who have designated that user as a contact. When a user boots up a computer on which the messaging service is installed, for those computers that are continuously connected to the Internet, the user is typically automatically signed in with the messaging service server. Alternatively, a user can selectively "sign in" with this server, which causes the status of the user's icon that appears in other users' messaging windows designating that user as a contact to change from "Not Online" to "Online."

To add additional contacts to the messaging window of a user, the user need only enter the person's name and email address, or implement a search to find the information for a person within a member directory or in a contact/address list accessible via the user's computer. It is also possible for a user to send a message to another person through the messaging service if the name and email for the recipient are known, even if the intended recipient is not yet included in the list of contacts for the user. However, the recipient will need to be a user of the messaging service and be signed in.

Thus far, contacts accessible through messaging services have been limited to individuals. A user can optionally carry on a chat session with a plurality of other persons, but there is no provision in the prior art for communicating with a software application using a plain language query. The potential advantages of such a capability are significant, since data might then be readily accessed through an appropriate "software application contact" with the same ease currently enjoyed when communicating with live persons using a messaging service. For example, an online messaging service user discussing the sales of a product in different regions of the country with a contact might need to determine what the sales of the product were in a particular region last quarter. Instead of interrupting the dialogue in the messaging service to start a database program that might be used to provide the information, it would be far more efficient to simply query the database program within the messaging service program as if the database program were simply another contact. The query entered in the message chat window in plain language might be, "What was the total revenue generated by sales of widgets in the Western Region last quarter?" A software database application program should be capable of responding to this query with a similar plain language response in the instant messaging service program, such as, "The total revenue generated by the sales of widgets in the Western Region last quarter was $1,248, 395.94," or more simply, with a response such as "$1,248, 395.94."

Efficient engines for parsing a plain language query are well known in the prior art and have been developed for numerous applications. For example, a plain language query interface is provided in Microsoft Corporation's SQL SERVER™ database program that enables a user to simply type a query in English (or in a different language, depending upon the version of the interface provided). Other application programs such as Microsoft Corporation's OFFICE™ products enable a user to enter a plain language query to obtain help on a specific feature or function.

Numerous other examples exist in the prior art of software programs that parse plain language queries and return a relevant response. For example, an online search engine called ASK JEEVES™ has been developed that responds to plain language queries entered on a web page to enable a user to search for web sites and data on the Internet. The response provided is a list of questions that the parsing engine determines might be related, from which the user can select. Once a question in the list is selected, the user is connected to a web site where an answer to the question might be provided. However, use of this search engine requires that the user first open a browser program, indicate the appropriate URL for the search engine, e.g., www dot askjeeves dot com, and then type the query in the text dialog box provided on the search engine web page.

There appears to be no provision in the prior art for including a software application such as a search engine program or a database as a contact in an online messaging service, so that the software application responds to a message or query entered by a user in the chat window, just as if the software program were a live person interacting with a user in a messaging service session. As the online messaging services grow in popularity, such a feature will become increasingly more important to facilitate the efficient exchange of information between participants. Ideally, a messaging service session involving two or more live contacts and one or more software applications that interact just like a contact could provide an important tool that would enable the participants to effectively access and exchange information within the messaging service session. One of the great advantages of the Internet is the facility with which information can be obtained by anyone connected to it. Accessing data through a software resource that acts like a live contact in a messaging service session should further improve the participants' ease in obtaining information.

SUMMARY OF THE INVENTION

The present invention provides the mechanism for an efficient interaction with a software resource such as a database, search engine, or other software program, from within a messaging service session, generally as discussed above. When a user is engaging in a messaging service session, the user can selectively add a software resource that has registered itself as being available to participate as a contact. Once registered, the software resource can receive a plain language message or query entered by any user during a messaging service session. The software resource parses the plain language message and determines an appropriate response that is then transmitted back to the user within the messaging service context. Thus, to the user, the software resource appears to be responding just as any other live participant in the online session.

The user is enabled to selectively direct the message to the software resource, but other live participants can respond also. In fact, the user can selectively add one or more persons as participants in the online chat session. Any person thus added will also receive the plain language response from the software resource, within the messaging service session.

There may be instances when the software resource fails to find an appropriate response or simply fails to successfully parse the plain language message. In this case, the response provided to the user is preferably a nil response. Alternatively, the software resource may transmit an indication that an answer cannot be provided.

As is customary in an online messaging service session, a visual indication (such as a graphic icon) will preferably be provided to indicate that the software resource is online and available to participate in the online chat session as a participant.

Although the plain language message might be a simple statement to which the software resource responds, in most cases, it is likely that the plain language message will comprise a query, and the plain language response will then comprise data responsive to the query.

It is contemplated that the present invention can be implemented in other types of chat sessions. However, it is initially to be implemented in a messaging service. In this implementation, the software resource will register with a server through which the messaging service is implemented for all participants, including the software resource.

When determining the plain language response, it is likely that the software resource will search through data available to it. For example, if the software resource is an online search engine, the data returned to the user may include one or more web addresses. In other cases, the software resource may be a database program that opens a database to determine the response based upon the data that it has accessed.

Another aspect of the present invention is directed to a medium having software instructions for implementing the steps of the method, generally as described above.

Still another aspect of the present invention is a system that implements functions generally in accord with the steps of the method described above. The system includes a messaging service server that is coupled to a network and is programmed for implementing registration of prospective participants available to be added to a messaging service session. A user computing device that is coupled to the network includes a processor programmed to execute a messaging service session in which a user is a participant, add a software resource as a participant in the messaging service session, and enable a user to enter a plain language query indicating desired information to be obtained from the software resource within the messaging service session. A software resource computing device, which is also coupled to the network, is programmed to parse a plain language query received during a messaging service session and provide an appropriate response.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
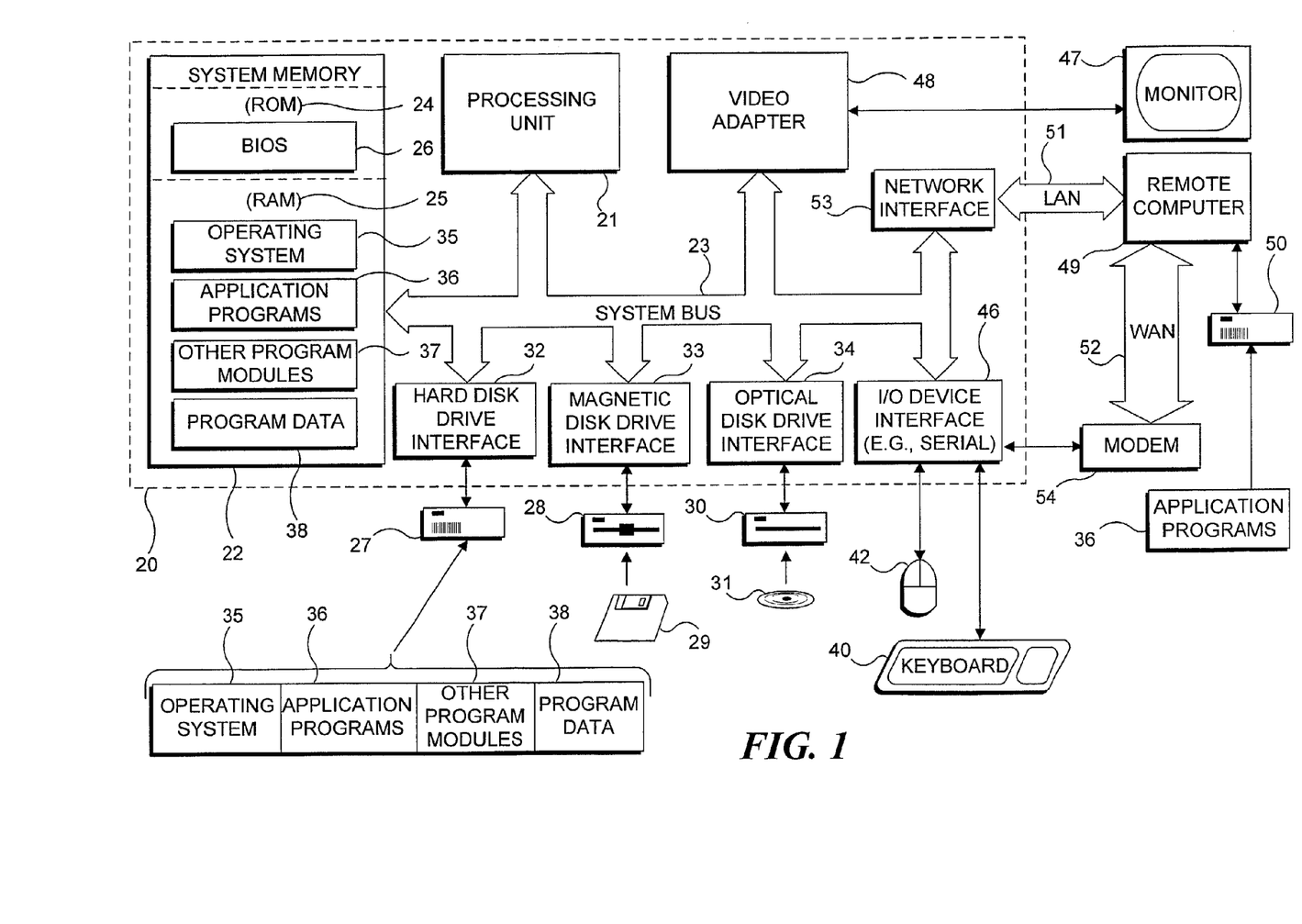
FIG. 1 is a block diagram of an exemplary system for a general purpose computing device in the form of a conventional personal computer (PC) suitable for implementing the present invention.

FIG. 1 and the following discussion provide a brief, general description of an exemplary computing environment that can be used for each of the computers employed in a messaging service session in which the present invention is implemented. The functions carried out by each computing device linked in a system for implementing the invention are defined by computer executable instructions, such as program modules, that are executed by a PC or other network communication device useful for participating in a messaging session. Generally, program modules include application programs, routines, objects, components, functions, data structures, etc. that perform particular tasks or implement particular abstract data types. Also, those skilled in the art will appreciate that in addition to PCs, this invention may be implemented in other processing environments, such as in a client device for displaying a Web page, hand-held devices, pocket personal computing devices, digital cell phones adapted to execute application programs and to wirelessly connect to a network, other microprocessor-based or programmable consumer electronic devices, multiprocessor systems, network workstations, minicomputers, mainframe computers, and the like.

With reference to FIG. 1, an exemplary system usable to practice the present invention includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that helps to transfer information between elements within PC 20 such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media which can store data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information such as messages input for transmission to other participants in a messaging session into PC 20 through input devices such as a keyboard 40 and a pointing device 42. Pointing device 42 is preferably a mouse, although other types of user input devices, such as a track ball, a joystick, or a stylus can instead be used. Other input devices (not shown) for PC 20 may include a microphone, a game pad, a satellite dish, a scanner, or the like. These and other input/output (I/O) devices are often connected to processing unit 21 through an I/O device interface 46 that is coupled to system bus 23. The term I/O device interface is intended to encompass each interface specifically used for a serial port, a parallel port, a game port, a keyboard port, a PS/2 port, and/or a USB port. A monitor 47 or other type of display device is also connected to system bus 23 via an appropriate interface, such as a video adapter 48, and is usable to display application programs, Web pages, and/or other information, such as the messaging dialog windows. In addition to the monitor, PCs are often coupled to other peripheral output devices (not shown), such as speakers (through a sound card or other audio interface—(not shown)) and printers.

PC 20 operates in a networked environment, using logical connections to one or more remote computers, such as a remote computer 49, on which the present invention is also implemented to enable messaging sessions between PC 20 and remote computer 49. Remote computer 49 may be another PC, a server (which is typically generally configured much like PC 20), a network workstation, a peer device, or a satellite or other common network node, and typically includes many or all of the elements described above in connection with PC 20, although only an external memory storage device 50 has been illustrated in FIG. 1. Although not shown in this drawing, another similar PC is coupled to the network and is set up as the messaging server. The logical connections depicted in FIG. 1 include a local area network (LAN) 51 and a wide area network (WAN) 52. Such networking environments are common in offices, enterprise wide computer networks, intranets, and for coupling to the Internet.

When used in a LAN networking environment, PC 20 is connected to LAN 51 through a network interface or adapter 53. When used in a WAN networking environment, PC 20 typically includes a modem 54, or other means for establishing communications over WAN 52, which may include the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

While the present invention is not specifically limited to a particular messaging service program, an initial preferred embodiment is implemented using Microsoft Corporation's MSN MESSENGER SERVICE™ software program. While it may be included as part of an operating system in the future, currently the MSN MESSENGER SERVICE program is selectively downloaded and installed by a user who wishes to employ the program for messaging in order to hold chat (instant messaging) sessions with designated contacts, and to carry out other functions available through the MSN MESSENGER SERVICE program. Once installed on a user's computer, the messaging service program is readily accessed by selecting an icon within the task bar or other location on the desktop of the user.

Figure 2:
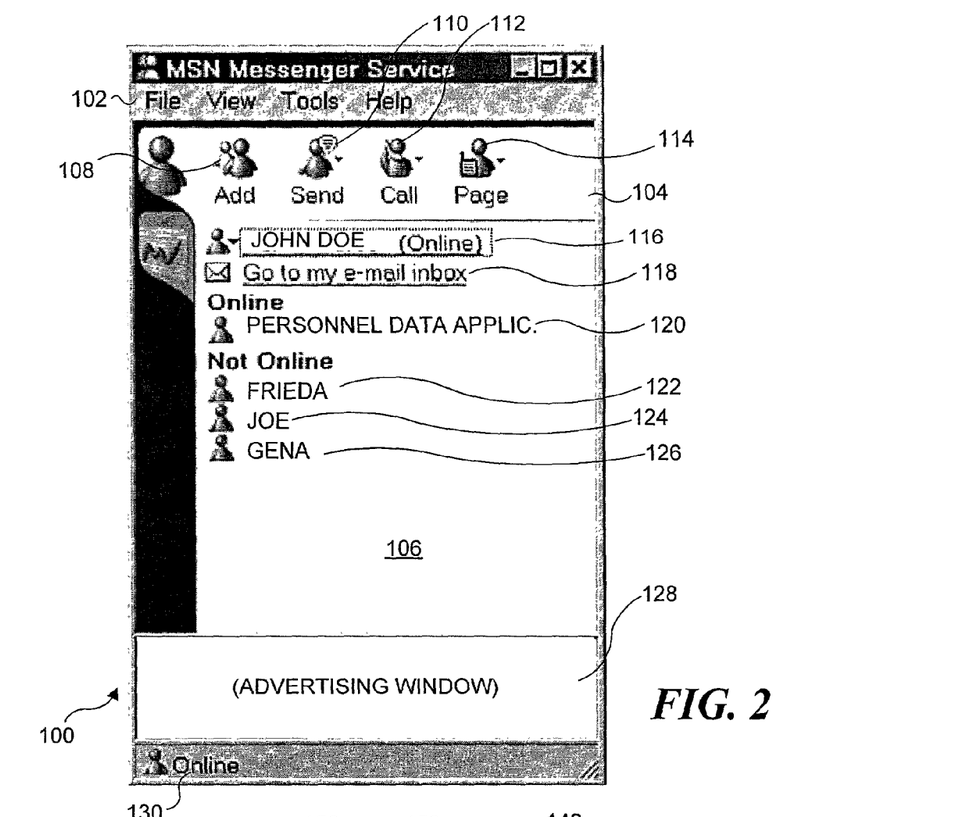
FIG. 2 is an exemplary messaging service dialog window showing a software personnel data application participating in a messaging session with a user.

An exemplary dialogue window 100 where the messaging service is illustrated in FIG. 2. It should be emphasized that the MSN MESSENGER SERVICE program currently being made available for download does not have the ability to directly communicate with a software resource or software program as provided in the present invention. However, this functionality can readily be added as explained below. Dialogue window 100 includes a menu bar 102 that lists "file," "view," "tools," and "help." Selection of any of these menu items results in a dropdown list being displayed that provides further options for a user to select in connection with the messaging service program. Immediately below menu bar 102 is disposed an icon bar 104. The icons provided therein include an "Add" icon 108, "Send" icon 110, a "Call" icon 112, and a "Page" icon 114. If the user selects Add icon 108, a further dialogue entitled "Add a Contact" is displayed (not shown) that enables the user to add a contact based upon an e-mail address or a sign-in name of that person, or by searching for a contact. In connection with the present invention, the URL for the software application on a specific server is entered by the user to designate the software resource as a "contact" of the user. In this way, a software resource is added by user to the list of contacts, just as if the software resource were a person instead of a software application or program.

Selection of send icon 110 causes a dropdown box to list as well as displaying the option "Other," which, if selected, enables the user to enter an e-mail address for another contact as a recipient of an instant message. In this manner, the user can selectively send an instant message to a user who is not normally a contact, but who has the messaging service program installed on his/her computer. Call icon 112 enables the user to selectively dial a phone number, or to call the computer of any contact who is currently online, or enables the user to publish phone number(s) of the user. These phone number(s) will have been entered by the user within a set-up screen for the menu item "Options" displayed by the MSN MESSENGER SERVICE program. Similarly, selection of Page icon 114 enables the user to page a contact who has a pager and has provided a number for the pager. This icon also can be selected to enable the user to set up a pager address by entering data identifying the type of device and other information necessary to facilitate dialing the user's pager. The pager data are then made available to contacts selected by the user to enable those contacts to page the user through the MSN MESSENGER SERVICE program.

In the example illustrated in FIG. 2, a contact status window 106 includes a line 116 in which the user is listed along with the status of the user. Optionally, the user can select a line 118 that will cause the user's e-mail in-box to open. Also included in contact status window 106 are a list of the user's contacts who are online and a list of those who are not. In the example shown in FIG. 2, only the software resource identified as the personnel data application is included in the list of the contacts online. Three other contacts, including Frieda 122, Joe 124, and Gena 126, are included in the list of contact who are not online. When a contact is listed as not online, the contact is either not using or away from his/her computer, or the computer is not connected to the Internet or other network over which the messaging operates, or the user may have signed out or not have signed into the messaging service.

It should be emphasized that only those contacts selectively added by a user are included in the contact status window. Contacts who are listed as being online may be away from their computer, and if their computer is not used for a first predefined period of time, e.g., for 15 minutes, the icon for the contact will change to indicate that the contact may be unavailable. A contact will be moved to the list of those who are not online if their computer has not been used for more than a second predefined period of time (e.g., 60 minutes). When a contact is not online, it is not possible for the user to chat with the contact using the messaging service program.

Exemplary dialogue window 100 includes an advertising window 128 in which advertising text and/or graphics is provided for various services and products. Also included is a status indication line 130, which indicates the current status of the user.

Figure 3:
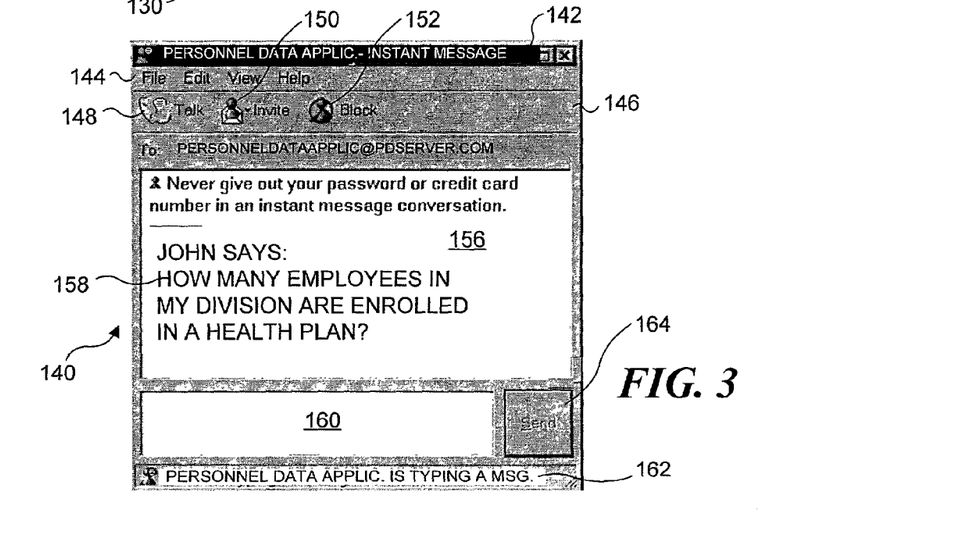
FIG. 3 is an exemplary instant messaging service chat window in which a user has sent a query to a software program that is supplying a response in the instant message session.

To chat or send an instant message to any contact currently online and available, a user need only double click on the name or identification of the online contact within contact status window 106, or click on Send icon 110 and select the contact from a dropdown list that then appears. Once a contact who is currently available has been selected, an instant message dialogue box 140 is displayed, generally as shown in the example of FIG. 3. Instant message dialogue box 140 includes a menu bar 144 and an icon bar 146. However, slightly different menu items are included in menu bar 144 than in that of the exemplary dialogue window shown in FIG. 2. Also, icon bar 146 includes a Talk icon 148, an Invite icon 150, and a Block icon 152. The significance of these icons is not particularly relevant to the present invention, and therefore, they need not be further discussed.

A message history pane 156 includes a history of the chat messages transmitted between participants of a chat session initiated using the MSN MESSENGER SERVICE program. In the example shown in FIG. 3, a message 158 indicates that the user (John) has transmitted a message to the Personnel Data Application. The message is a query asking, "How many employees in my division are enrolled in a health plan?" To create this message, the user simply enters the message text in a message window 160 by typing on a keyboard or using another kind of input device. The message is transmitted to a recipient by selecting a send button 164 or simply by actuating the return key on a keyboard (if that option has been selected when setting up the messaging service program). A line 162 indicates that the Personnel Data Application (the software resource to which the query was transmitted) is "typing a message" (i.e., composing a response) that will shortly be transmitted back to the user and appear within chat history window 156. For example, the response might be simply a number, indicating the number of employees in the user's division that are enrolled in a health plan. Instead, a more complete response such as, "25 employees are enrolled in a health plan in your division," might be supplied to the user as a response. Accordingly, so far as the user is concerned, the interaction with the software resource, i.e., the Personnel Data Application, that responds to the query is substantially identical to what would be expected from a person responding to the user in a chat session using the messaging service program.

In this example, the Personnel Data Application or program runs on a specific server or computing device. As indicated in the example of FIG. 3, the query was directed to the uniform resource locator (URL): "mailto (colon) (colon) personneldataapplication (at) pvserver dot com." This URL completely identifies the location of the software resource and the server on which it is running. This URL is associated with the Name of the software resource that is included in the list of contacts, shown in FIG. 2.

It is important to note that the interaction between a person and the "system" in a chat session is subject to all of the normal and conventional security and authorization procedures that apply to accessing traditional applications. For example, if the system queries a database program that is registered as a participant in a chat session on behalf of a user who is asking a question, it will first employ the user's identity to verify that the user has rights to access the data in the database to see the results. The procedure and requirement for checking a user's permission to access the database is very similar to the general techniques used conventionally in three-tier applications, where a middle tier broker issues requests on behalf of users, but enforces security and permissions checks as part of the process.

Figure 4:
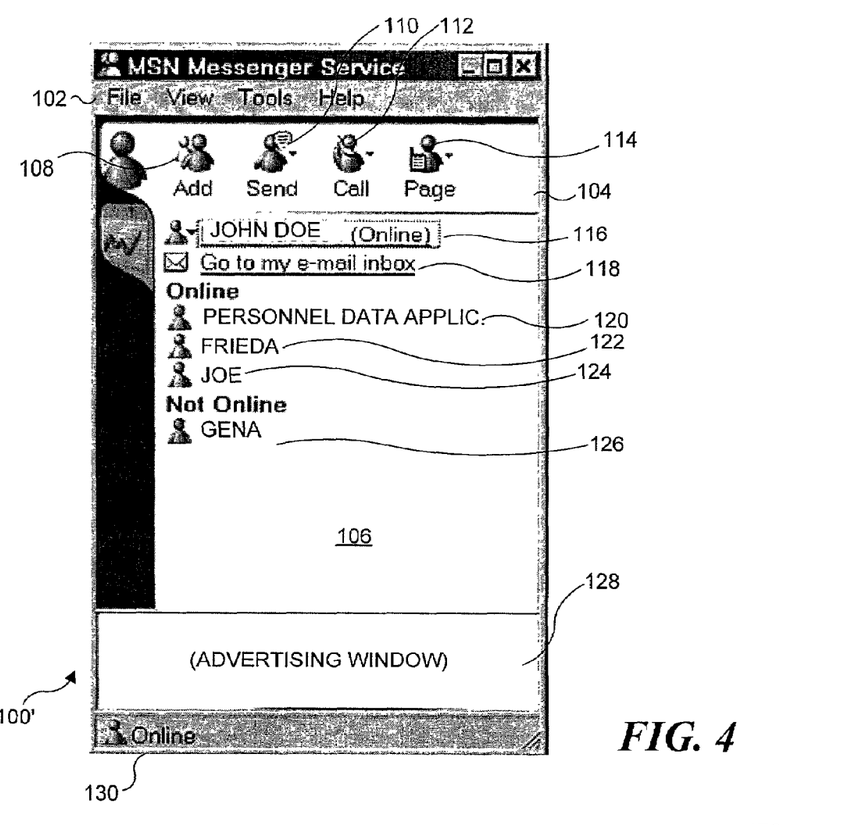
FIG. 4 is an exemplary instant messaging service dialog window showing a plurality of participants, including the software personnel data application, participating in a messaging session with the user.

As a further example, FIG. 4 illustrates yet another exemplary dialogue window 100' showing how a plurality of contacts are online and available to be included within a messaging service chat session. In this example, the same reference numbers are used to identify each of the components of exemplary dialogue window 100' as were used for exemplary dialogue window 100 in FIG. 2. The primary difference between exemplary dialogue window 100 and exemplary dialogue window 100' is that in addition to Personnel Data Application 120, Frieda 122, and Joe 124 are also online and available to participate in the messaging service chat session. However, Gena 126 is still not online and is thus unavailable to participate. In this case, the user can initiate an online chat session with either Joe and/or Frieda and while discussing a document or other matter with either or both, can selectively add Personnel Data Application 120 to the messaging service chat session as a participant. A query posed by any of the participants to the online chat session might be answered by any of the other participants, including the Personnel Data Application, if participating. Although only a single software resource has been illustrated in the examples of FIGS. 2 and 4, it will be understood that a plurality of such resources might also be included within a messaging service chat session. In addition, a user can selectively direct a query to a specific one of the participants in the session, including a specific software resource or program. In many instances, it will be apparent that the software resource has access to data that a person does not and is therefore the best choice among the contacts participating in a chat session to answer a query posed by the user or one of the other participants.

In the event that a query directed to a software resource is not understood or if the software resource is unable to provide an answer, the software resource can simply remain silent, providing no response (i.e., a nil response) or alternatively, it can provide a response indicating that the query was not understood or that data responsive to the query was unavailable to the software resource.

It is contemplated that a variety of different types of software resources or application programs could participate as contacts within a messaging service session. For example, Microsoft Corporation's SQL SERVER™ database program can currently access data within a database in response to a plain English query. The ability to parse a plain English (or other plain language) query is already provided in SQL SERVER. Furthermore, as noted above in the Background of the Invention, techniques for parsing a plain language message are well known by those of ordinary skill in the art, to determine an appropriate response. Examples of such parsing techniques are included in the Help programs provided with numerous types of business applications, such as Microsoft Corporation's OFFICE™ products. Accordingly, it is a relatively easy task to provide any software application with a parsing engine that can interpret a plain language message or query, and based upon the interpretation of the message provided by parsing, determine an appropriate response.

Particularly applicable to the present invention are software resources that have access to data, such as a database programs. Another appropriate type of program that would clearly be useful in providing data in accord with the present invention are search engines that have access to data resources on the Internet (or on other networks). When sent a query through the messaging service program, a search engine could return an appropriate response, or alternatively, return one or more URLs from which the user can select to access a web site at which the desired response to the query might likely be found. The uses of such a capability are virtually limitless. By providing access to a software resource from within the context of a messaging service session, a user can interact with other live contacts and seek information or data from the software resources as required to serve the needs of the live participants.

Figure 5:
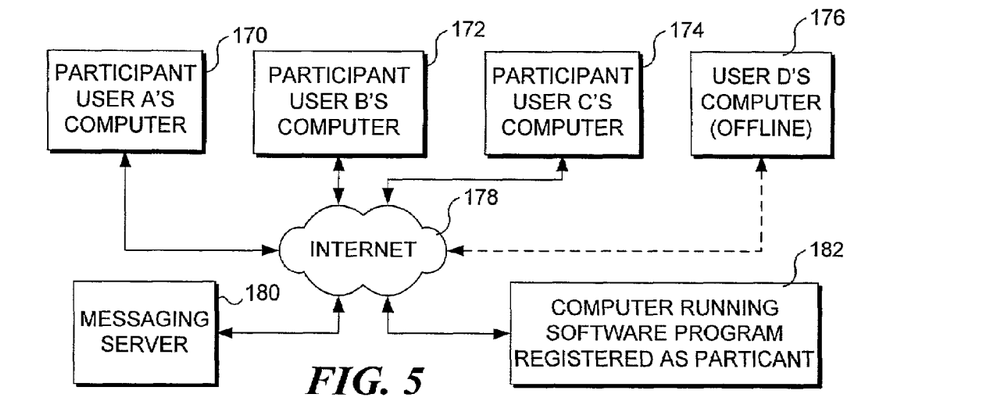
FIG. 5 is a block diagram of a network illustrating different computers that are linked in a messaging session.

FIG. 5 provides further details concerning the functional components included in the present invention for implementing access to a software resource in a messaging service session in which the software resource is simply treated as a live contact or participant. In FIG. 5, Internet 178 provides a common network to which all of the other components of the system are connected in communication with each other. A plurality of participants including A, B, C, and D respectively have access to computers 170, 172, 174, and 176. Each of these computers is coupled to Internet 178 through a suitable communication link, whether by a modem, xDSL connection, cable modem, or satellite connection. In addition, a messaging server 180, which is responsible for administering the messaging service and for registering participants as they sign in to use the service, is coupled to the Internet through a comparable type of communication link. Messaging server 180 accepts the registration of a software resource as a participant in the messaging service, just as it does live participants. A computer executing the software program that is registered as a participant 182 in the messaging service is also coupled to Internet 178. The software program registers with messaging server 180 when initially loaded and executed on the computer. Thereafter, for each user who has added the software program as a contact, the software program will appear online and available to participate in a messaging service session.

Since user D's computer 176 is currently not online, it is shown coupled to Internet 178 by a dash line, indicating that it has the potential to become an online participant. Similarly, a computer on which a software resource has not yet been executed might be shown as a prospective participant, but not yet online. It is also contemplated that the software resource might be running on a user's own computer, although in most cases, the software resource will be executed on a remote computer or at least on a separate computer in a local area network to which the user's computer is coupled in data communication. Accordingly, it must be emphasized that the present invention is not limited to an Internet messaging system, but is also applicable to any local or wide area network that is running a messaging service for the users of computers connected in communication with each other.

Figure 6:
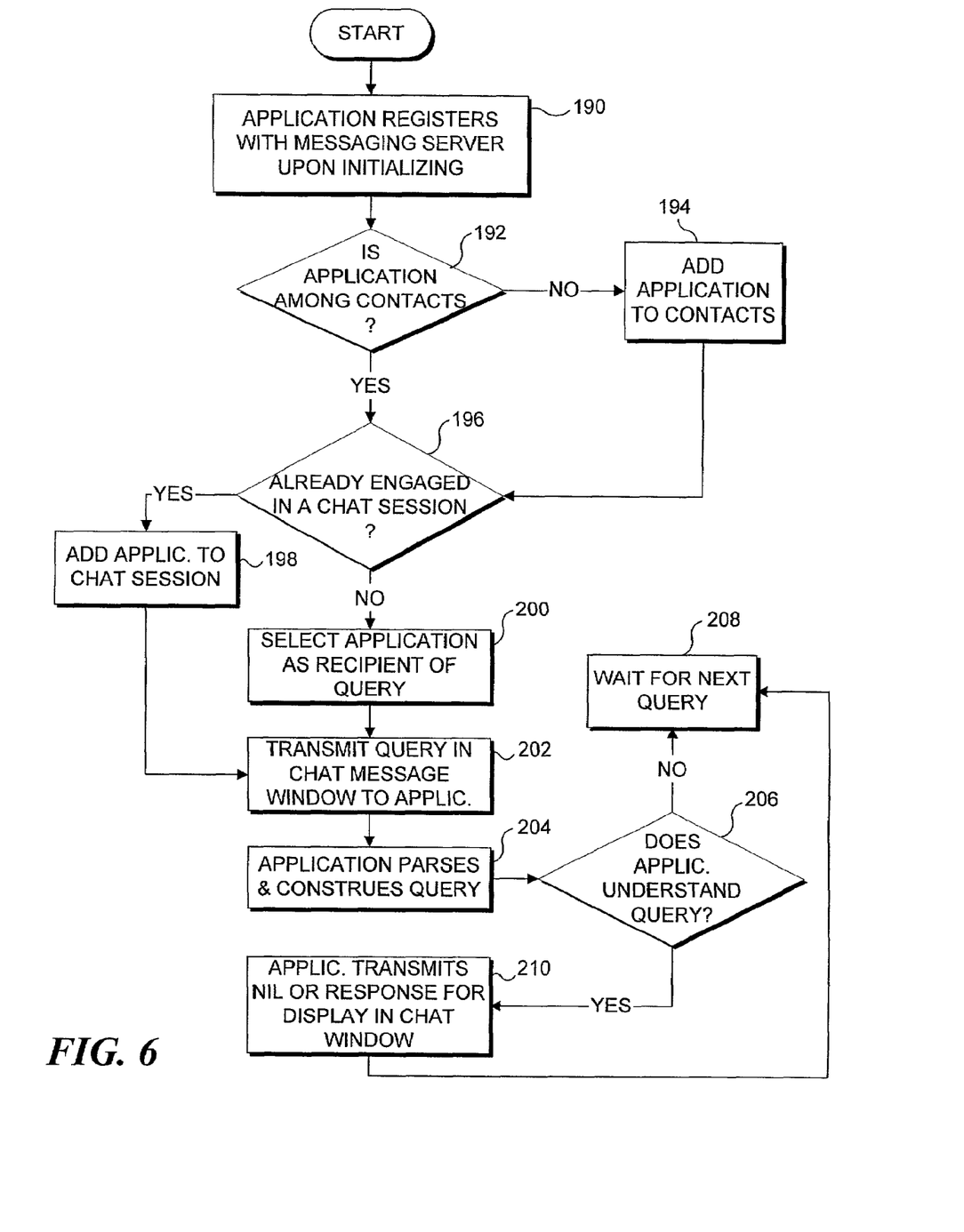
FIG. 6 is a flow chart illustrating the logic for implementing the present invention.

The logic involved in implementing the present invention is carried out at several different points in the system illustrated in FIG. 5. FIG. 6 shows the logical steps implemented in the present invention beginning at a start block. At a step 190, an application or software resource registers with messaging server 180. Registration of the software resource or application program is generally equivalent to an action taken by a participant of the messaging service signing in, for example, after being away for a period of time or upon booting the participant's computer. The step of registering the software resource provides a notification to messaging server 180 that the software resource is available to be included in a messaging service session.

A decision block 192 then determines if the application is among the contacts of a specific user. This decision is applied in connection with all users who are interested in adding the software resource as a contact during a messaging service session. The decision determines if the application has already been added, and if not, in a step 194, the software application or resource is added to the list of contacts for a specific user wishing to do so. Thereafter, the logic proceeds with a decision block 196 that determines if the user is already engaged in a chat or messaging service session. Similarly, if the response to decision block 192 is affirmative, the logic also proceeds to decision block 196.

A positive response to decision block 196 leads to a step 198 in which the application or software resource is added to the current chat session. At this point, any of the participants in the chat session can transmit a message or query to the software application, and it will appear as an online contact in the contact status window displayed to each of the participants in the messaging service session. If not already engaged in a chat session in decision block 196, a step 200 provides for selecting the software application as a recipient of the query; this step is selectively carried out by the user who has elected to add the software application to a list of contacts to prospectively participate in the messaging service session. Following step 198 or step 200, a step 202 enables any participant in the chat session to transmit a query entered in a chat message window to the software application just as if the software application were a person participating in the messaging service session. Thereafter, in a step 204, the software application or resource parses the query that it has received over the network from a participant in the session and attempts to construe the meaning of the query. Clearly, it is possible for a participant in a chat session to pose a query that is not understood by the software resource that parses it. Accordingly, a decision block 206 determines if the parsing engine of a software resource or application understands the query. It should be noted that starting at decision block 192 through step 202, each of the decision blocks or steps discussed above are carried out by one or more of the participant user's computers. In contrast, step 204 is implemented by computer 182, which is executing the software program registered as a participant in the session.

If the response to decision block 206 is negative, indicating that the software application does not understand or cannot construe the query, a step 208 indicates that the software resource simply waits for another query, since no action can be taken in regard to the query that was presented to it. However, if the application understands the query, it is also possible for the application or software resource to be unable to respond if the data required for the response are unavailable to it. A step 210 provides for the software application to transmit either nothing (nil) in response or the software application will carryout a function needed to provide an appropriate response to the query that will then be displayed in the chat window of each of the participants to the messaging service session. For example, if the software application is a database program, it will search its available data to form a response to the query that it received and then transmit the response to the participants in the messaging service session. Following transmission of the response and its display by the participant's computers (if a response is transmitted), the logic then proceeds also to block 208 in which the software resource participating in the chat session waits for the next query. It remains in this state until terminated, or the computer executing the software application is de-energized.

Based upon the proceeding, it will be evident that by simply providing a plain language parsing engine as a front end to a software application, as is well known in the art, the software application is able to participate in a messaging service session, just as if it were a live participant, and can then provide a response to a query directed to it, without leaving the messaging service session. This technique thus offers considerable efficiency in accessing data during a messaging service session, compared to other means of access the data.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. At a computer system configured to manage an online chat session relating to a specified subject being discussed between a plurality of members of a group of chat participants, the group including a plurality of computer users, a computer implemented method for including a plurality of computer users as members of the group of chat participants and a plurality of software resources as members of the group of chat participants within the online chat session conducted through a messaging service, each software resource in the plurality of software resources being includable in the online chat session, comprising the steps of:

(a) receiving a first request to add a first software resource to an online chat session from a first member of the online chat session, each of the plurality of software resources being available to participate in the online chat session, when added by a chat session member;

(b) receiving a second request to add a second software resource to the online chat session from a second member of the online chat session;

(c) including both the first software resource and the second software resource, along with the plurality of computer users, as members in a group of online chat participants, each member in the group of chat participants, including the software resources, capable of sending a plain language message relating to the specified subject being discussed to all the other members in the group of chat participants, including those software resources that have been added by online chat session members including at least the first and second software resources;

(d) one of the plurality of computer users transmitting the plain language message to a plurality of members of the group of online chat participants, including the plurality of software resources that have been added by online chat session members;

(e) the first software resource receiving from a member of the group of chat participants a submission of a plain language message related to the specified subject being discussed;

(f) the first software resource parsing each received plain language message to generate a query for data related to the specified subject being discussed, the parsing performed in response to receiving the plain language messages;

(g) the first software resource submitting the generated query to at least one database to obtain data specific to the subject being discussed;

(h) the first software resource receiving a response to the query from at least one of the at least one databases;

(i) the first software resource determining a plain language response to the message based on the received database response, the plain language response being related to the subject being discussed; and (j) the first software resource transmitting the plain language response back to all of the members of the group of chat participants, including the member that submitted the plain language message and including at least one other member that did not submit the plain language message, thus enabling each member of the group of chat participants to equally interact with the software resource as another participant in the online chat session, by responding to the plain language message relating to the specified subject being discussed.

2. The method of claim 1, further comprising the step of enabling the user to selectively direct the message to the software resource.

3. The method of claim 1, wherein one or more of the plurality of computer users answers the plain language message sent to the software resource.

4. The method of claim 3, wherein the user that submitted the message receives multiple responses to the message including responses from the software resource and one or more of the plurality of computer users.

5. The method of claim 1, wherein, if the software resource is unable to determine a plain language response to the plain language message, the response is one of a nil response and an indication that a response cannot be provided.

6. The method of claim 1, further comprising the step of providing a graphic indication that the software resource is online and available to participate in the online chat session as a participant.

7. The method of claim 1, wherein the plain language message comprises a query, and the plain language response comprises data responsive to the query.

8. The method of claim 1, wherein the step of registering comprises the step of registering with a messaging service server through which the messaging service is implemented for all participants in the online chat session, including the software resource.

9. The method of claim 1, wherein the step of determining the plain language response includes the step of employing the software resource to search through data accessible by the software resource to find data provided in the plain language response.

10. A machine readable medium having processor-executable machine instructions for performing steps (b)-(d) as recited in claim 1.

11. A machine readable medium having processor-executable machine instructions for performing steps (a) and (e)-(g) as recited in claim 1.

12. A method for accessing information available through a software resource during a messaging service session relating to a specified subject being discussed, comprising the steps of:

(a) indicating participants in a group of online chat participants in the messaging service session, the group including as members in the group a plurality of users and at least a first software resource and a second software resource from among a plurality of software resources, the first software resource being added in response to a request from a first user to add the first user to the group, the second software resource being added in response to a request from a second user to add the second user to the group;

(b) enabling any of the plurality of users to enter a plain language message in the messaging service session relating to a specified subject being discussed;

(c) one of the plurality of computer users transmitting the plain language message to a plurality of members of the group of online chat participants, including at least one of the software resources;

(d) the first software resource parsing each plain language message to generate a query for data related to the specified subject being discussed, the parsing performed in response to receiving the plain language messages;

(e) the first software resource submitting the generated query to at least one database to obtain data specific to the subject being discussed;

(f) the first software resource receiving a response to the query from at least one of the at least one databases;

(g) the first software resource automatically determining information responsive to the plain language message based on the received database response, the plain language response being related to the subject being discussed; and (h) the first software resource transmitting the information responsive to the plain language message back to all of the members of the group of chat participants, including the member that submitted the plain language message and including at least one other member that did not submit the plain language message, thus enabling each member of the group of chat participants to equally access information through the software resource, wherein the software resource acts as a participant in the messaging service session by responding to the plain language query entered by any of the plurality of users, the plain language message relating to the specified subject being discussed.

13. The method of claim 12, wherein the software resource and all other participants in the messaging service session are coupled in communication over a network.

14. The method of claim 12, further comprising the step of enabling the user to selectively add the software resource to the messaging service session from a list of prospective participants.

15. The method of claim 12, further comprising the step of enabling the user to selectively direct the plain language message to the software resource.

16. The method of claim 12, wherein the software resource comprises a data manager program that accesses a store of data to find the information responsive to the plain language message transmitted from the user.

17. The method of claims 12, further comprising the step of transmitting an indication from the software resource to the user that information responsive to the plain language message could not be provided.

18. The method of claim 12, further comprising the step of providing an indication to a user when the software resource is unavailable to participate in a messaging service session.

19. The method of claim 12, wherein the information provided by the software resource includes a network address at which data responsive to the query are located.

20. The method of claim 12, wherein a plurality of software resources are included in a list of prospective participants in the messaging service session.

21. A system for enabling a software resource to respond as a conventional participant in a messaging service session implemented over a network, comprising:

(a) a messaging service server coupled to the network and programmed for implementing registration of prospective instant message participants available to be added to a messaging service session as participants;

(b) a plurality of user computing devices coupled to the network, each including a processor programmed to:
   (i) execute a messaging service session in which members of a group of online chat participants including a plurality of users and a plurality of software resources are discussing a specified subject;
   (ii) add at least a first software resource and a second software resource as members of the group of online chat participants in the messaging service session to interact with other online chat participants regarding the specified subject, the first software resource being added in response to a request from a first user to add the first user to the group, the second software resource being added in response to a request from a second user to add the second user to the group; and
   (iii) enable any of the plurality of users to enter a plain language message for information to be obtained from the software resource within the messaging service session; and (c) a software resource computing device coupled to the network and programmed to:
   (i) execute the software resource;
   (ii) register the software resource with the messaging service server when the software resource is available to participate in a messaging service session as a participant;
   (iii) parse each plain language message received from one of the plurality of users during the messaging service session to generate a query for data related to the specified subject being discussed, the parsing performed in response to receiving the plain language messages;

(iv) submit the generated query to at least one database to obtain data specific to the subject being discussed;

(v) receive a response to the query from at least one of the at least one databases;

(vi) determine a plain language response to the message based on the received database response, the plain language response being related to the subject being discussed (vii) transmit said information to all of the members of the group of chat participants, including the user computing device that submitted the plain language message and including at least one other member that did not submit the plain language message over the network, thus enabling each member of the group of chat participants to equally interact with the software resource as another participant in the online chat session, by enabling the software resource to respond to the plain language message relating to the specified subject being discussed.

22. The system of claim 21, wherein the software resource computing device includes a data store from which the information is derived to respond to the plain language message received during the messaging service session.

23. The system of claim 21, wherein the user computing device includes a user interface that enables a user to enter the plain language message into the messaging service session.

24. The system of claim 21, wherein the user computing device includes a display on which the messaging service session is viewed, an image viewable during said messaging service session including an indication of whether the software resource is available to participate in the messaging service session.

25. The system of claim 21, wherein the user computer device is programmed to enable a user to selectively add the software resource as a participant in the messaging service session.

26. Apparatus that includes a software resource as a member of a group of chat participants within an online chat session relating to a specified subject being discussed conducted through a messaging service, comprising:

(a) a network interface that connects to a network over which the messaging service session is communicated;

(b) a display;

(c) a user input device;

(d) a memory in which a plurality of machine instructions are stored; and (e) a processor coupled to the network interface, the display, the user input device, and the memory, said processor executing the machine instructions, causing the processor to carry out a plurality of functions, including:

(i) receiving a first request to add a first software resource to an online chat session from a first member of the online chat session, each of the plurality of software resources being available to participate in the online chat session, when added by a chat session member;

(ii) receiving a second request to add a second software resource to the online chat session from a second member of the online chat session;

(iii) including both the first software resource and the second software resource, along with the plurality of computer users, as members in a group of online chat participants, each member in the group of chat participants, including the software resources, capable of sending a plain language message relating to the specified subject being discussed to all the other members in the group of chat participants, including those software resources that have been added by online chat session members including at least the first and second software resources;

(iv) one of the plurality of computer users transmitting the plain language message to a plurality of members of the group of online chat participants, including the plurality of software resources that have been added by online chat session members;

(v) the first software resource receiving from a member of the group of chat participants a submission of a plain language message related to the specified subject being discussed;

(vi) the first software resource parsing each received plain language message to generate a query for data related to the specified subject being discussed, the parsing performed in response to receiving the plain language messages;

(vii) the first software resource submitting the generated query to at least one database to obtain data specific to the subject being discussed;

(viii) the first software resource receiving a response to the query from at least one of the at least one databases;

(ix) the first software resource determining a plain language response to the message based on the received database response, the plain language response being related to the subject being discussed; and (x) the first software resource transmitting the plain language response back to all of the members of the group of chat participants, including the member that submitted the plain language message and including at least one other member that did not submit the plain language message, thus enabling each member of the group of chat participants to equally interact with the software resource as another participant in the online chat session, by responding to the plain language message relating to the specified subject being discussed.

27. Apparatus that enables at least one software resource of a plurality of software resources to interact as a participant during a messaging service session relating to a specified subject being discussed, comprising:

(a) a network interface that connects to a network over which the messaging service session is communicated;

(b) a memory in which a plurality of machine instructions are stored; and (c) a processor coupled to the network interface, and the memory, said processor executing the machine instructions, causing the processor to carry out a plurality of functions, including:

(i) registering at least a first software resource and a second software resource of the plurality of software resources with a messaging service as being available to participate in a messaging service session as a member of a group of online chat participants, the group including as members of the group a plurality of users, the first software resource and the second software resource the first software resource being added in response to a request from a first user to add the first user to the group, the second software resource being added in response to a request from a second user to add the second user to the group;

(ii) parsing a plain language message relating to a specified subject being discussed received from any of the plurality of users during a messaging service session in which the software resource has been added as a participant by one or more of the plurality of users, the software resource being enabled to receive and parse the plain language message, the parsing performed in response to receiving the plain language messages;

(iii) submitting the generated query to at least one database to obtain data specific to the subject being discussed;

(iv) receiving a response to the query from at least one of the at least one databases;

(v) automatically determining information responsive to the plain language message based on the received database response, the plain language response being related to the subject being discussed;

(vi) transmitting the information responsive to the plain language message over the network to all of the members of the group of chat participants, including the member that submitted the plain language message and including at least one other member that did not submit the plain language message, thus enabling each member of the group of chat participants to equally access information through the software resource.

* * * * *

UNITED STATES PATENT AND TRADEMARK OFFICE
CERTIFICATE OF CORRECTION

| | | |
|---|---|---|
| PATENT NO. | : 7,353,247 B2 | Page 1 of 1 |
| APPLICATION NO. | : 10/016790 | |
| DATED | : April 1, 2008 | |
| INVENTOR(S) | : Paul James Hough et al. | |

It is certified that error appears in the above-identified patent and that said Letters Patent is hereby corrected as shown below:

In column 14, line 17, in Claim 17, delete "claims" and insert -- claim --, therefor.

Signed and Sealed this
Twenty-second Day of February, 2011

David J. Kappos
*Director of the United States Patent and Trademark Office*